United States Patent
Ahmed et al.

(10) Patent No.: US 10,002,166 B2
(45) Date of Patent: *Jun. 19, 2018

(54) OPTIMIZE FOLLOWER AND SEARCH RELEVANCY RATIO

(71) Applicant: International Business Machines Corporation, Armonk, NY (US)

(72) Inventors: Maryam Ahmed, Vaughan (CA); Trudy L. Hewitt, Cary, NC (US); Kimberly D. McCall, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/362,954

(22) Filed: Nov. 29, 2016

(65) Prior Publication Data
US 2017/0075900 A1    Mar. 16, 2017

Related U.S. Application Data

(63) Continuation of application No. 14/314,896, filed on Jun. 25, 2014, now Pat. No. 9,582,583, which is a continuation of application No. 14/061,492, filed on Oct. 23, 2013, now Pat. No. 9,471,687.

(51) Int. Cl.
*G06F 17/30* (2006.01)
*G06Q 10/06* (2012.01)
*G06Q 50/00* (2012.01)

(52) U.S. Cl.
CPC ...... *G06F 17/3053* (2013.01); *G06F 17/3089* (2013.01); *G06F 17/30595* (2013.01); *G06F 17/30598* (2013.01); *G06F 17/30864* (2013.01); *G06F 17/30867* (2013.01); *G06Q 10/06* (2013.01); *G06Q 50/01* (2013.01)

(58) Field of Classification Search
CPC .................................................. G06F 17/30876
See application file for complete search history.

(56) References Cited

U.S. PATENT DOCUMENTS

| | | |
|---|---|---|
| 9,471,687 B2 | 10/2016 | Ahmed et al. |
| 2009/0265257 A1 | 10/2009 | Klinger et al. |
| 2011/0106589 A1 | 5/2011 | Blomberg et al. |
| 2011/0153377 A1 | 6/2011 | Novikov et al. |

(Continued)

OTHER PUBLICATIONS

Liu, Dong et al., Boost Search Relevance for Tag-Based Social Image Retrieval, Proceedings of the 2009 IEEE international conference on Multimedia and Expo, 2009, IEEE, Piscataway, United States.

(Continued)

*Primary Examiner* — Albert M Phillips, III
(74) *Attorney, Agent, or Firm* — Stephen R. Yoder (57) ABSTRACT

System, method, and computer program product to perform an operation, the operation including: defining a timing schedule for publishing a set of items of content in a first content class and a second content class for publication based on a content class ratio and corresponding scores of the set of items of content, publishing, by operation of one or more computer processors and according to a first method, the set of items of content on a social media platform based on the timing schedule, monitoring a plurality of metrics for the set of items of content, and modifying the content class ratio upon determining that the content class ratio impacts the plurality of metrics.

20 Claims, 3 Drawing Sheets

(56) References Cited

U.S. PATENT DOCUMENTS

| | | |
|---|---|---|
| 2011/0231296 A1 | 9/2011 | Gross et al. |
| 2011/0270649 A1 | 11/2011 | Kerho |
| 2011/0302103 A1 | 12/2011 | Carmel et al. |
| 2011/0314101 A1 | 12/2011 | Redmon et al. |
| 2012/0036085 A1 | 2/2012 | Srivastava et al. |
| 2012/0131013 A1 | 5/2012 | Hobbs et al. |
| 2012/0215903 A1 | 8/2012 | Fleischman et al. |
| 2012/0254152 A1 | 10/2012 | Park et al. |
| 2013/0275348 A1 | 10/2013 | Booth et al. |
| 2013/0290339 A1 | 10/2013 | LuVogt et al. |
| 2015/0112957 A1 | 4/2015 | Ahmed et al. |
| 2015/0112958 A1 | 4/2015 | Ahmed et al. |

OTHER PUBLICATIONS

Chen, Hailiang et al., Customers as Advisors: The Role of Social Media in Financial Markets, working papers series, Jan. 2013, Social Science Electronic Publishing, Inc., Rochester, United States.

Thiel, Killian et al., Creating Usable Customer Intelligence from Social Media Data: Network Analytics meets Text Mining, KNIME White Papers, 2012, Knime, Zurich, Switzerland.

Zarrella, Dan, "The Science of Social Timing Part 1: Social Networks", Jul. 2, 2011, 9 pages.

Finn, Greg, "Buffer Adds Analytics Upgrade for Twitter, Facebook & LinkedIn Shares", Aug. 1, 2012, 6 pages.

Miller, Jon, "The 4-1-1 Rule for Lead Nurturing", Inc.com, Sep. 13, 2013, pp. 1-3, <http://www.inc.com/jon-miller/the-411-rule-of-marketing.html>.

Coggins, Shai, "What's the Ideal Content Ratio?", Vervely, May 18, 2012, pp. 1-3, <http://vervely.com/whats-the-ideal-content-ratio/2012/>.

OPTIMIZE FOLLOWER AND SEARCH RELEVANCY RATIO

BACKGROUND

The present disclosure relates to computer software, and more specifically, to computer software to optimize follower and search relevancy of social media posts.

Entities publishing content in the age of social media must be mindful of the impact their publications have on their audience. A balance exists between publishing content that is important to the entity and content that is preferred by the audience. An imperfect balance may lead to the entity losing audience members as well as a reduction in the search engine ranking of business content published by the entity. Many entities use automated programs to periodically publish content on various social media sites. Therefore, there is a need to manage the ratio and timing these programs use to publish business content and non-business content.

SUMMARY

Embodiments disclosed herein provide a system, method, and computer program product to perform an operation, the operation including: defining a timing schedule for publishing a set of items of content in a first content class and a second content class for publication based on a content class ratio and corresponding scores of the set of items of content, publishing, by operation of one or more computer processors and according to a first method, the set of items of content on a social media platform based on the timing schedule, monitoring a plurality of metrics for the set of items of content, and modifying the content class ratio upon determining that the content class ratio impacts the plurality of metrics.

DETAILED DESCRIPTION

Embodiments disclosed herein regulate the balance between a business (or other) entity's different social media promotion goals by passively monitoring social media posts and prioritizing content based on established benchmarks. By monitoring the timing, ratio, and content of publications, embodiments disclosed herein may dynamically adjust these attributes in order to further the entity's social media goals without negatively impacting any of them. An entity may have any number of social media goals, including but not limited to engaging with clients through social media (regardless of the client's access to business content), and increasing a search engine ranking of (and subsequent accesses to) business content regardless of whether clients want or like the business content. When engaging with clients through social media, the entity may wish to keep and increase their number of followers, as well as get their followers to click on content that is being promoted through social media. By promoting business content through social networking sites, the entity may also increase a search engine ranking for the business content, regardless of whether it is clicked on or not.

In order to create a balance between the goals, embodiments disclosed herein define at least two content classes (or types) of social media publications and the metrics used to identify whether the social media publications are being fulfilled. For example, the at least two content classes of social media publications may be defined as promoting "business-related content" and "user-preferred content." Business-related content may be any content which is business-specific, including but not limited to advertising, marketing, technical support, sales, development, and the like. User-preferred content may be any content which is used to engage with the entity's followers, including but not limited to videos, educational posts, blog posts, and the like. The metrics, may include, but are not limited to, a number of click-thrus by followers receiving the social media publications, a number of followers for the entity's social media account, a search engine ranking of business-related content linked to by a social media publication, and a change in accesses to the business-related content. A "social media publication," as used herein, refers to posting, sharing, or broadcasting a message, photo, video, or any other content on one or more social media networking sites. Examples of a social media networking site may include, but are not limited to Twitter® (Twitter is a registered trademark of Twitter, Inc.), LinkedIn® (LinkedIn is a registered trademark of LinkedIn, Ltd.), Facebook® (Facebook is a registered trademark of Facebook, Inc.), and Google+® (Google+ is a registered trademark of Google, Inc.).

Additionally, embodiments of the disclosure may define a content class ratio (also referred to as "a ratio") of a number of publications promoting "business-related content" and a number of publications promoting "user-preferred content." For example, a content class ratio may be established based on historical data that indicates that the number of followers and click-thrus do not decline if the ratio of promoted content is 65% business-related content to 35% user-preferred content. Embodiments disclosed herein may then monitor the defined metrics to determine a content impact as content is published through different social media sites based on the ratio. If one or more of the metrics begins to decline (for example, follower or click-thru count), embodiments disclosed herein may dynamically identify this negative content impact, and adjust the class of content being promoted to include less business-related content and more user-preferred content. For example, the content class ratio may be changed to 55% business-related content and 45% user-preferred content, and the system may continue to publish content according to updated content class ratio, and monitor the metrics to ensure that the metrics improve. The content class ratio may be for one content class against another content class, or one content class against all other classes of content.

Additionally, embodiments disclosed herein may monitor the timing of social media publications in order to detect a content impact on any of the metrics. If, for example, publishing business-related posts during the daytime hours results in a decrease in the number of followers or click-thrus, embodiments disclosed herein may adjust a timing schedule for social media publications such that the business-related content is distributed during the nighttime hours. Further still, embodiments disclosed herein may consider how the content is being promoted (i.e., automated publications versus manual publications created by a human), and dynamically make adjustments based on changes to the metrics. For example, if followers decline after a large number of automated publications, embodiments disclosed herein may prioritize more "personalized" publications created by human users, and reduce the number of automated publications.

Embodiments disclosed herein generally compute a content impact on the one or more metrics. A "content impact," as used herein, generally relates to an impact that any number of attributes have on the one or more metrics. The content impact may, for example, be an impact of one or more of the content itself, a method of publishing the content, the content class ratio, and timing of publishing the content on each of the of metrics. The content impact may be defined to include any number of criteria, and their impact on any number of metrics, and the use of specific criteria or metrics should not be considered limiting of the disclosure.

Although two content classes of social media publications are discussed as a reference example, embodiments disclosed herein support any number of classes of social media publications, and the particular publications used should not be considered limiting of the disclosure. Furthermore, the particular goals and metrics described herein are also reference examples, and should not be considered limiting of the disclosure, as any number and type of goals and metrics are contemplated by embodiments of the disclosure.

Figure 1:
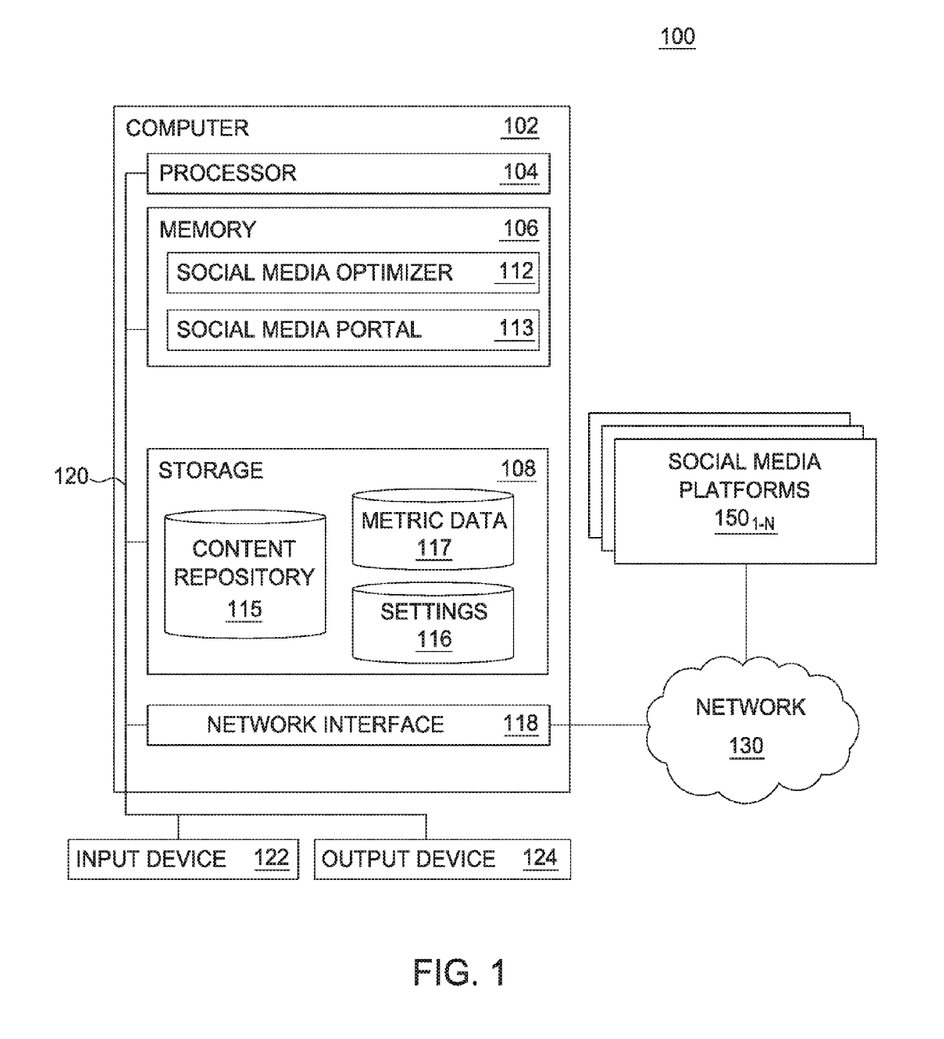
FIG. 1 illustrates a system to optimize follower and search relevancy ratio, according to one embodiment.

FIG. 1 illustrates a system 100 to optimize follower and search relevancy ratio, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, SAN storage, NAS storage, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains a social media optimizer 112, which is an application generally configured to monitor the effect social media publications have on metrics related to one or more goals. The social media optimizer 112 is configured to adjust a ratio of the class of publications as well as the timing of publications in response to the change in metrics. The social media portal 113 is an application generally configured to interface with one or more social media platforms 1501-N that allow users to, among other things, send and receive social media publications. Although depicted as separate applications, in one embodiment, the social media optimizer 112 and social media portal 113 are components of the same application. Furthermore, the social media optimizer 112 itself may be configured to interface with the social media platforms 1501-N. The social media platforms 1501-N may be any social media or networking site, presently known or unknown.

As shown, storage 108 contains a content repository 115, which stores a range of content that may be shared via one or more social media publications. For example, the content repository 115 may include, but is not limited to, web pages, articles, blog posts, videos, photos, or any kind of content. In one embodiment, the content in the content repository 115 is scored to reflect an overall importance or value to the entity, which is used by the social media optimizer 112 in order to schedule the content for publication. For example, the social media optimizer 112 may schedule the highest scored content first and most frequently, or may not schedule content whose score does not reach a relevance threshold. The storage 108 also contains a settings 116, which is generally configured to store configuration data for the social media optimizer 112, such as goals, metrics, timing schedules, publication schedules, classes (or types) of content, and the like. The storage 108 also contains a metric data 117, which is a repository configured to store metric data collected by the social media optimizer 112. The metric data 117 may include data for any number of metrics, as well as the content impact the metrics have on goals or other rules for publishing social media content. For example, the social media optimizer 112 may be configured to monitor metrics including social media followers and search engine rankings for business-related content. The social media optimizer 112 may then collect, at periodic intervals (or with each social media publication), data related to the metrics and store the collected metric data in the metric data 117.

Figure 2:
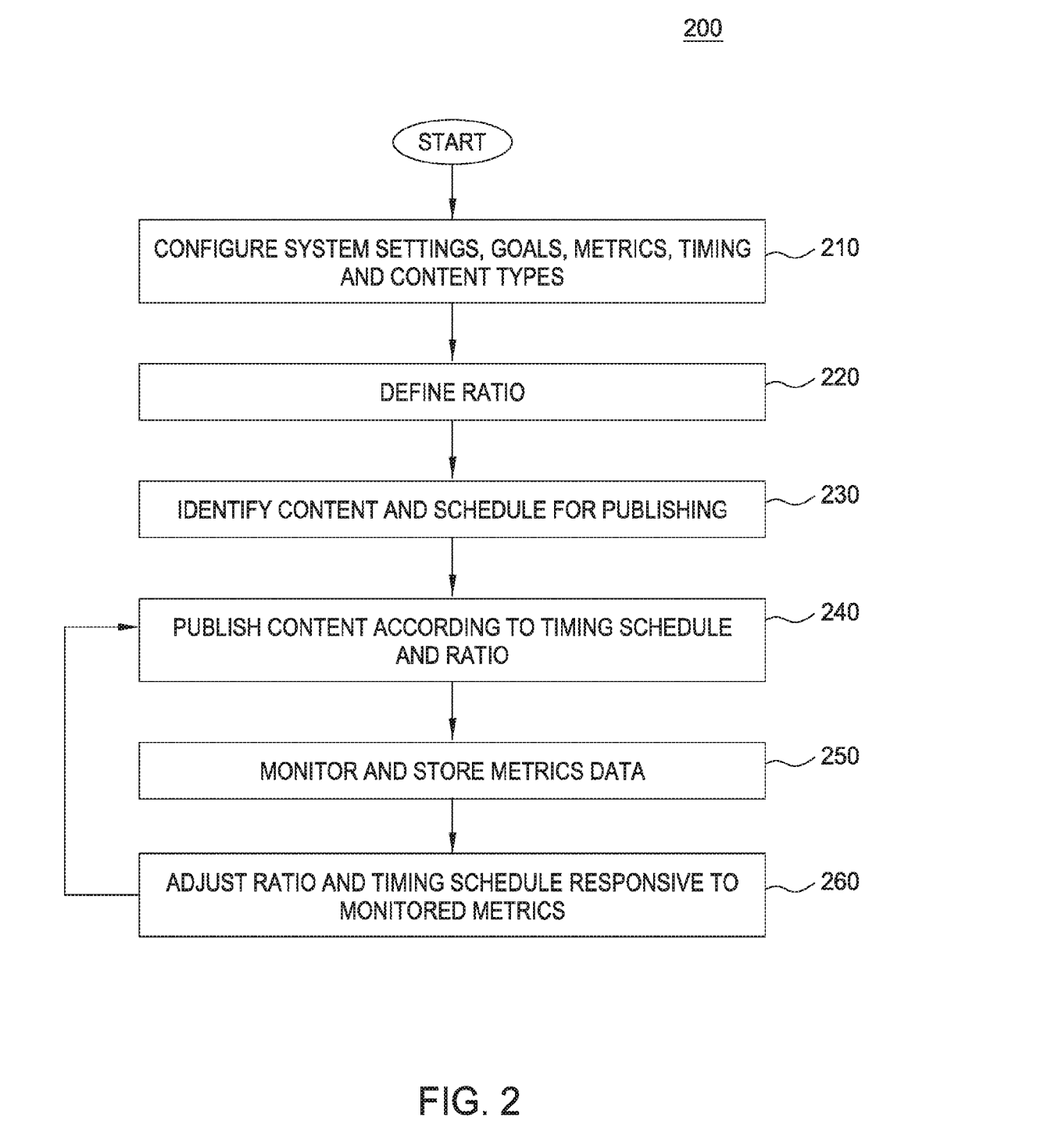
FIG. 2 illustrates a method to optimize follower and search relevancy ratio, according to one embodiment.

FIG. 2 illustrates a method 200 to optimize follower and search relevancy ratio, according to one embodiment. Generally, the steps of the method 200 allow business (or other) entities to maintain a balance between different goals related to their social networking efforts by monitoring the effects different content class ratios and timing schedules used to publish different types of content have on predefined metrics, and adjust the ratios and schedules according to the change. At step 210, system settings are defined, including goals, metrics, timing, and content type criteria. A user may define the settings, or predefined settings in the social media optimizer 112 may be used. For example, the types (or classes) of content published by the business entity may be defined as including business-related content and user-preferred content, although any number and class of content may be defined. The business entity may seek to increase access to their business-related content while not alienating clients that are following their social media channels. The metrics used to monitor progress towards these goals may be a number of click-thrus to user-preferred content, a number of followers on different social media channels, a search engine ranking for the business-related content, and a number of accesses to the business-related content. A timing schedule may specify to publish business-related content during off-peak hours on specific intervals, while user-preferred content may be scheduled to publish daily during peak hours. The content type criteria is specific to the content types defined, and may include a plurality of attributes. For example, business-specific content may be technical reports, documentation, tutorials, instructions, and the like, while user-preferred content may be photos, videos, or documents describing new and exciting features of a product or service. Generally, any type of system data may be configured at step 210.

At step 220, the social media optimizer 112, or a user, defines a content class ratio for publishing user-preferred and business-related content on the social media sites. The ratio of business-related to user-preferred content may be any numerical ratio, and may be based on historical metric data. The ratio may also be a default ratio specified by the social media optimizer 112. At step 230, the social media optimizer 112 scans the content repository 115 to identify content that it may schedule for publishing. For example, the social media optimizer 112 may identify an instructional video which satisfies one or more criteria for being considered business-related content, and a user-submitted video which displays new capabilities of a product that satisfies one or more criteria for being user-preferred criteria. Additionally, the social media optimizer 112 may score the content based on relative importance to the organization, which impacts how quickly (or whether) it is published. Based on the analysis, the social media optimizer 112 may schedule the instructional video and the user-submitted video for publication at specific times, in accordance with the ratio and other criteria. At step 240, the social media optimizer 112 publishes, through the social media portal 113, the scheduled business-related and user-preferred content. At step 250, the social media optimizer 112 may monitor and store metrics data in the metrics data 117. An example of the data stored in the metric data 117 is shown in Table I as follows:

TABLE I

| ID | Type | Content Class Ratio (Business:User) | Time | Change in Follower Count | Change in search engine ranking | Change in click-thru (relative to mean) | Business-related content accesses (relative to mean) | Change in Sharing Activity | Change from Analytics/Historical Data (Relative to similar, past published content) | Action based on Change from Analytics/Historical Data |
|---|---|---|---|---|---|---|---|---|---|---|
| 100 | Business-related, automatic | 1:1 | Sun. 1:00 PM | +20 | +1000 | N/A | +50 | +2 | >10% | Low growth, may adjust type of content and date/time in attempt to increase growth |
| 101 | User-preferred, automatic | 1:1 | Sun. 3:00 PM | +1 | N/A | None | N/A | +1 | <1% | May adjust date and/or time for promoting business vs. user preferred content based on decline trend |
| 102 | User-preferred, manual | 1:1 | Sun. 4:00 PM | +100 | N/A | +500 | N/A | +10 | >50% | May prioritize similar content for this date/time for future publishing based on growth |
| 103 | Business-related, automatic | 2:1 | Thurs. 11:00 AM | −200 | None | N/A | −50 | −5 | <35% | May adjust date/time for promoting business vs. user preferred content based on decline trend |
| 104 | Business-related, manual | 1:1 | Fri., 11:00 AM | +40 | +100 | N/A | 100 | +4 | >20% | May prioritize similar content for this date/time for future publishing based on growth |
| 105 | User-preferred, manual | 1:1 | Sat., 3:00 PM | +100 | N/A | +100 | N/A | +10 | >65% | May prioritize similar content for this date/time for future publishing based on growth |

TABLE I-continued

| ID | Type | Content Class Ratio (Business:User) | Time | Change in Follower Count | Change in search engine ranking | Change in click-thru (relative to mean) | Business-related content accesses (relative to mean) | Change in Sharing Activity | Change from Analytics/ Historical Data (Relative to similar, past published content) | Action based on Change from Analytics/ Historical Data |
|---|---|---|---|---|---|---|---|---|---|---|
| 106 | Business-related, automatic | 1:1 | Thursday 11:00 PM | +10 | +300 | N/A | +4 | +1 | >2% | Low growth, may make adjustments to type of content and date/time to attempt to increase growth |

As shown, the content class ratio initially began at 1:1, which produced positive results for publications 100-102, as their relevant metrics all saw positive (or no) changes, such as a +100 follower count for publication 102, a +1 change in sharing activity for publication 101, and a +1000 search engine ranking for publication 100. Furthermore, the publications 100-102 also saw increased percentage changes in analytics against historical analytic data for similar, previously published content, such as the greater than 50 increase for publication 102. Accordingly, a different action has been described for each publication based on the change of the current analytics versus historical data. For example, the social media optimizer 112 may, for publication 102, prioritize similar content at similar dates and time based on growth. As another example, the social media optimizer 112 may, for publication 100, make adjustments to the type of content and the timing schedule in an attempt to increase growth.

However, when the ratio was changed to 2:1, as in publication 103, the social media optimizer 112 detected and recorded a content impact of a decrease in 200 followers and 50 accesses relative to the average business-related content. Based on this negative content impact, at step 260, described in greater detail with reference to FIG. 3, the social media optimizer 112 may adjust the ratio responsive to the monitored metrics. The action taken by the social media optimizer 112 for publication 103 may be reflected in Table I as adjusting the date and time for promoting different types of content based on the decline trend. As a result, as shown in Table I, when the ratio returns to 1:1 with publications 104-105, the metric data improves across the board. Additionally, the social media optimizer 112 may determine the content impact each individual publication has on the metrics.

Furthermore, the social media optimizer 112 is configured to detect a content impact the method of publication (automatic or manual) has on the metrics. As shown, publications 102 and 105 are both user-preferred manual publications that published at the same time on a weekend, each having positive content impacts on relevant metrics. However, publication 101 is an automatic user-preferred publication published roughly the same time as publications 102 and 105, but saw a decrease in relevant metrics. Therefore, the social media optimizer 112 may note this and change the scheduled posts for this time of day and type of content to be manual. Further still, the social media optimizer 112 is configured to detect a content impact the time of publication has on metrics. As shown, publications 103 and 106 are the same type of publications, published according to the same ratio, on the same day, but at different times. However, publication 103 resulted in a decrease in metrics, while publication 106 resulted in an increase in metrics. Based on this change, the social media optimizer 112 may determine that the timing of future publications should follow that of publication 106, rather than publication 103. Further still, the social media optimizer 112 may note that the growth in publication 106 was low, and may make adjustments to the type of content and timing of future publications to further increase growth.

Figure 3:
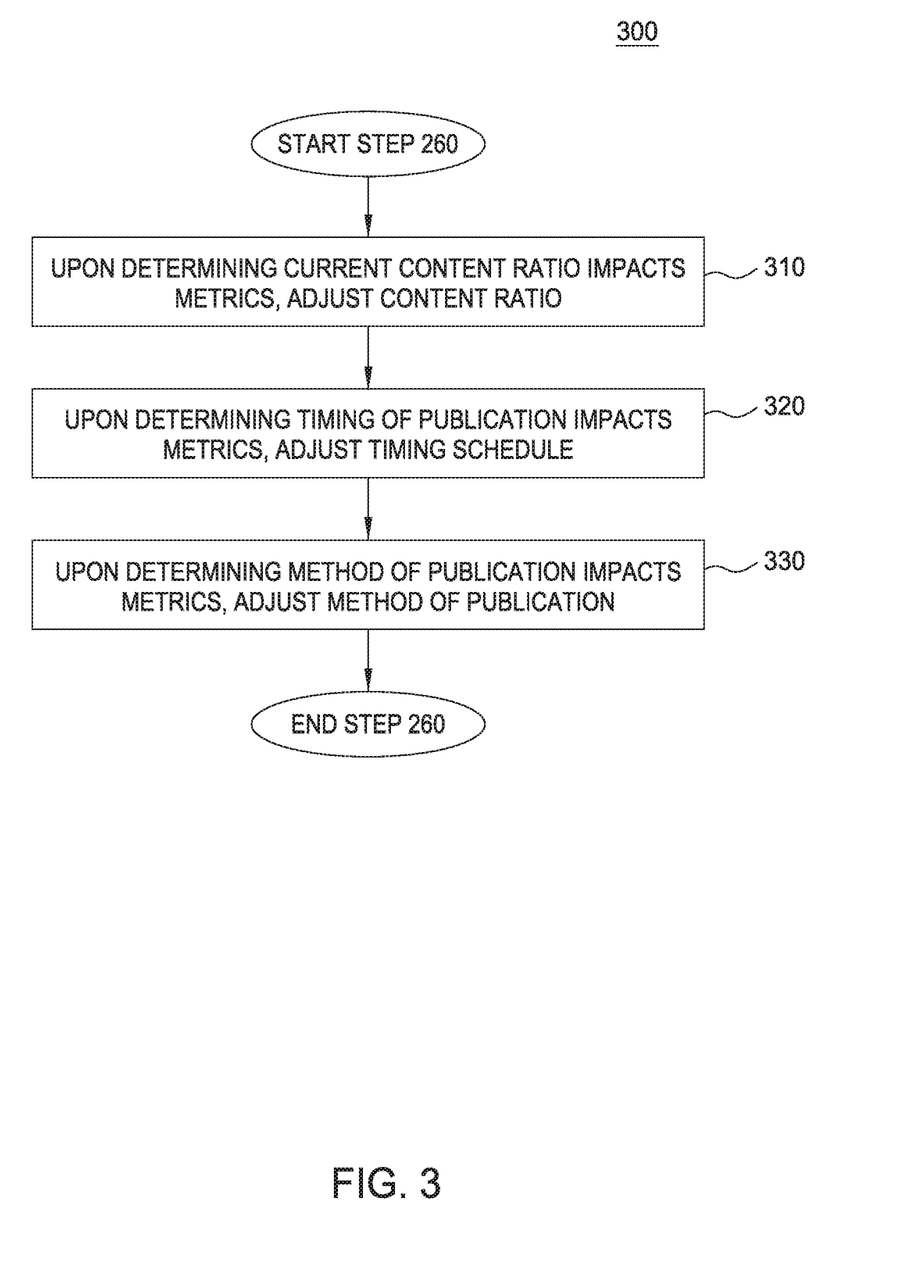
FIG. 3 illustrates a method to adjust a ratio and timing schedule to publish content, according to one embodiment.

FIG. 3 illustrates a method 300 corresponding to step 260 to adjust a ratio and timing schedule to publish content, according to one embodiment. In one embodiment, the social media optimizer 112 performs the steps of the method 300. Generally, in executing the steps of the method 300, the social media optimizer 112 may dynamically adjust the ratio of publication, the timing of publication, as well as the method of publication upon detecting a change in metrics data. At step 310, the social media optimizer 112 may adjust the content ratio upon determining the current content ratio impacts the metrics. For example, if the social media optimizer 112 determines the current content ratio negatively impacts metrics, it may revert to previous ratios, or adjust the ratio towards previous ratios that produced favorable metrics. If the change in metrics is positive, the social media optimizer 112 may optionally change the ratio, or take no action. At step 320, the social media optimizer 112 may adjust the timing schedule upon determining the current timing of publications impacts the metrics. For example, if the social media optimizer 112 determines that publishing user-preferred content during peak hours results in positive increases to metrics, but publishing user-preferred content during off peak hours results in no increase or a decrease to metrics, the social media optimizer 112 may adjust future publications of user-preferred content such that it is published during peak hours. At step 330, the social media optimizer 112 adjusts the method of publication upon determining that the current method of publication impacts metrics. The method of publication may include a particular social media site content is published to, as well as whether the publications are programmatically generated or user generated. If the current methods decrease metrics, the social media optimizer 112 may stop publishing using these methods. For example, if the metrics indicate that users strongly prefer user-generated (non-automated) publications, the social media optimizer 112 may scale back the number of automated publications in favor of user-generated publications.

Advantageously, embodiments disclosed herein provide automated techniques to monitor and dynamically adjust social media publications in order to manage a balance between different social media goals. Embodiments disclosed herein allow the goals to be fulfilled without alienating or annoying social media followers (clients, customers, etc). By passively monitoring metrics, the ratio of classes of content published, timing of publication, and method of publication can be dynamically changed based on changes to the metrics to ensure that goals and objectives are being met.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access social media applications or related data available in the cloud. For example, the social media optimizer could execute on a computing system in the cloud and monitor the impact social media publications have on different metrics related to social media goals of an organization. In such a case, the social media optimizer could monitor the metrics, and update and store publication ratios and timing schedules at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
  establishing, within a set of items of content, a first class of content items and a second class of content items;
  assigning an importance score to each item of content in the set of items of content according to relative importance among the set of items of content;
  defining a timing schedule for publishing the set of items of content based on a first content class ratio that defines a ratio by which the first class of content items and the second class of content items are published during a specified time period and further based on the importance score of each item of content;
  publishing, by operation of one or more computer processors and according to a first method, the set of items of content on a social media platform based on the timing schedule;
  monitoring a plurality of metrics corresponding to publications of the set of items of content based on the established classes of items; and
  creating a second content class ratio by modifying the first content class ratio upon determining that the first content class ratio impacts the plurality of metrics.

2. The method of claim 1, further comprising:
  publishing additional items of content according to the second content class ratio.

3. The method of claim 1, further comprising:
  monitoring the plurality of metrics corresponding to publications of the set of items of content based on the timing schedule;
modifying the timing schedule upon determining a timing of publishing impacts the plurality of metrics.

4. The method of claim 1, further comprising:
  monitoring the plurality of metrics corresponding to publications of the set of items of content based on the first method of publishing;
  modifying the first method of publishing upon determining the first method of publishing impacts the plurality of metrics.

5. The method of claim 1, further comprising:
  establishing the first content class ratio based on historical metrics.

6. The method of claim 1, wherein the plurality of metrics comprise: (i) a number of clickthroughs for the content, (ii) a number of users receiving the content, (iii) a number of users sharing the content, and (iv) a search engine ranking of a respective document linked to by the content.

7. The method of claim 1, further comprising:
  defining: (i) at least one criterion for classifying a first item of content as being of the first class of content items, and (ii) at least one criterion for classifying a second item of content as being of the second class of content items.

8. The method of claim 1, wherein the set of items of content is published on at least one social media site.

9. A computer program product comprising a computer readable storage medium having stored thereon:
  first program instructions programmed to establish, within a set of items of content, a first class of content items and a second class of content items;
  second program instructions programmed to assign an importance score to each item of content in the set of items of content according to relative importance among the set of items of content;
  third program instructions programmed to define a timing schedule for publishing the set of items of content based on a first content class ratio that defines a ratio by which the first class of content items and the second class of content items are published during a specified time period and further based on the importance score of each item of content;
  fourth program instructions programmed to publish, according to a first method, the set of items of content on a social media platform based on the timing schedule;
  fifth program instructions programmed to monitor a plurality of metrics corresponding to publications of the set of items of content based on the established classes of items; and
  sixth program instructions programmed to create a second content class ratio by modifying the first content class ratio upon determining that the first content class ratio impacts the plurality of metrics.

10. The computer program product of claim 9, having further stored thereon:

seventh program instructions programmed to publish additional items of content according to the second content class ratio.

11. The computer program product of claim 9, having further stored thereon:
seventh program instructions programmed to monitor the plurality of metrics corresponding to publications of the set of items of content based on the timing schedule;
eighth program instructions programmed to modify the timing schedule upon determining a timing of publishing impacts the plurality of metrics.

12. The computer program product of claim 9, having further stored thereon:
seventh program instructions programmed to monitor the plurality of metrics corresponding to publications of the set of items of content based on the first method of publishing;
eighth program instructions programmed to modify the first method of publishing upon determining the first method of publishing impacts the plurality of metrics.

13. The computer program product of claim 9, having further stored thereon:
seventh program instructions programmed to establish the first content class ratio based on historical metrics.

14. The computer program product of claim 9, wherein the plurality of metrics comprise: (i) a number of clickthroughs for the content, (ii) a number of users receiving the content, (iii) a number of users sharing the content, and (iv) a search engine ranking of a respective document linked to by the content.

15. A computer system comprising:
a processor set; and
a computer readable storage medium;
wherein:
the processor set is structured, located, connected, and/or programmed to run program instructions stored on the computer readable storage medium; and
the program instructions include:
first program instructions programmed to establish, within a set of items of content, a first class of content items and a second class of content items;
second program instructions programmed to assign an importance score to each item of content in the set of items of content according to relative importance among the set of items of content;
third program instructions programmed to define a timing schedule for publishing the set of items of content based on a first content class ratio that defines a ratio by which the first class of content items and the second class of content items are published during a specified time period and further based on the importance score of each item of content;
fourth program instructions programmed to publish, according to a first method, the set of items of content on a social media platform based on the timing schedule;
fifth program instructions programmed to monitor a plurality of metrics corresponding to publications of the set of items of content based on the established classes of items; and
sixth program instructions programmed to create a second content class ratio by modifying the first content class ratio upon determining that the first content class ratio impacts the plurality of metrics.

16. The computer system of claim 15, wherein the program instructions further include:
seventh program instructions programmed to publish additional items of content according to the second content class ratio.

17. The computer system of claim 15, wherein the program instructions further include:
seventh program instructions programmed to monitor the plurality of metrics corresponding to publications of the set of items of content based on the timing schedule;
eighth program instructions programmed to modify the timing schedule upon determining a timing of publishing impacts the plurality of metrics.

18. The computer system of claim 15, wherein the program instructions further include:
seventh program instructions programmed to monitor the plurality of metrics corresponding to publications of the set of items of content based on the first method of publishing;
eighth program instructions programmed to modify the first method of publishing upon determining the first method of publishing impacts the plurality of metrics.

19. The computer system of claim 15, wherein the plurality of metrics comprise: (i) a number of clickthroughs for the content, (ii) a number of users receiving the content, (iii) a number of users sharing the content, and (iv) a search engine ranking of a respective document linked to by the content.

20. The computer system of claim 15, wherein the program instructions further include: seventh program instructions programmed to establish the first content class ratio based on historical metrics.

* * * * *